US005529398A

United States Patent [19]
Bosley

[11] Patent Number: 5,529,398
[45] Date of Patent: Jun. 25, 1996

[54] COMPLIANT FOIL HYDRODYNAMIC FLUID FILM THRUST BEARING

[76] Inventor: Robert W. Bosley, 18104 Hoffman Ave., Cerritos, Calif. 90701

[21] Appl. No.: 363,540

[22] Filed: Dec. 23, 1994

[51] Int. Cl.⁶ ................................................. F16C 17/06
[52] U.S. Cl. .......................................................... 384/105
[58] Field of Search ..................................... 384/105, 106, 384/122, 124, 103

[56] References Cited

U.S. PATENT DOCUMENTS

| | | |
|---|---|---|
| 3,375,046 | 3/1968 | Marley . |
| 3,382,014 | 5/1968 | Marley . |
| 3,495,886 | 2/1970 | Roberts et al. . |
| 3,635,534 | 1/1972 | Barnett . |
| 3,809,443 | 5/1974 | Cherubim . |
| 3,870,382 | 3/1975 | Reinhoudt . |
| 3,957,317 | 5/1976 | Silver ...................................... 384/103 |
| 4,082,375 | 4/1978 | Fortmann . |
| 4,116,503 | 9/1978 | Licht . |
| 4,208,076 | 6/1980 | Gray et al. . |
| 4,213,657 | 7/1980 | Gray . |
| 4,223,958 | 9/1980 | Gray . |
| 4,225,196 | 9/1980 | Gray . |
| 4,227,753 | 10/1980 | Wilcock . |
| 4,247,155 | 1/1981 | Fortmann . |
| 4,277,111 | 7/1981 | Gray et al. . |
| 4,277,112 | 7/1981 | Heshmat . |
| 4,277,113 | 7/1981 | Heshmat . |
| 4,300,806 | 11/1981 | Heshmat . |
| 4,315,359 | 2/1982 | Gray . |
| 4,315,660 | 2/1982 | Glienicke . |
| 4,348,066 | 9/1982 | Agrawal et al. . |
| 4,462,700 | 7/1984 | Agrawal .................................. 384/105 |
| 4,597,677 | 7/1986 | Hagiwara et al. ....................... 384/105 |
| 4,621,930 | 11/1986 | Gu et al. ................................ 384/105 |
| 4,624,583 | 11/1986 | Saville et al. . |
| 4,668,106 | 5/1987 | Gu ......................................... 384/105 |
| 4,682,900 | 7/1987 | Gu ......................................... 384/105 |
| 4,767,221 | 8/1988 | Paletta .................................... 384/105 |
| 4,871,267 | 10/1989 | Gu ......................................... 384/105 |
| 4,961,122 | 10/1990 | Sakai et al. . |
| 5,110,220 | 5/1992 | Gu ......................................... 384/105 |
| 5,248,205 | 9/1993 | Gu et al. . |
| 5,318,366 | 6/1994 | Nadjafi . |

*Primary Examiner*—Lenard A. Footland
*Attorney, Agent, or Firm*—Albert J. Miller

[57] ABSTRACT

A compliant foil hydrodynamic fluid film thrust bearing is disclosed which is comprised of a two sided thrust disk rotating element, compliant fluid foil members that axially enclose the rotating element, compliant spring foil members that axially enclose the fluid foil members, a spacer ring that coaxially surrounds the thrust disk and is axially disposed between the fluid foil members, and a compliantly mounted and spring preloaded thrust plate element and a foil retaining bearing housing with an inwardly facing thrust surface that together axially enclose the spring foil members, the fluid foil members and the spacer ring. The foils have self shimming rings at their peripheries and are formed by chemical etching from flat sheets. The fluid foils are subsequently coated with a wear resistant coating and then cold stamped to imboss compound curve profiles into the fluid foil to form wedge channels which induce vortex fluid flow patterns in the bearing's working fluid.

44 Claims, 6 Drawing Sheets

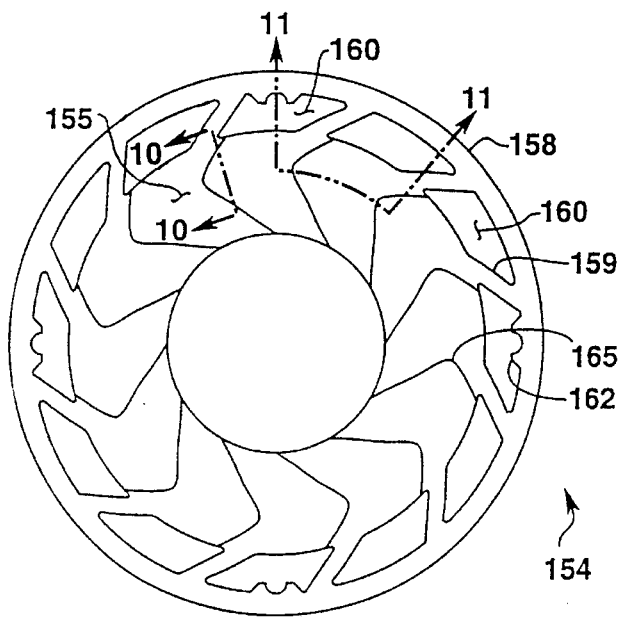
Fig. 9
Fig. 10
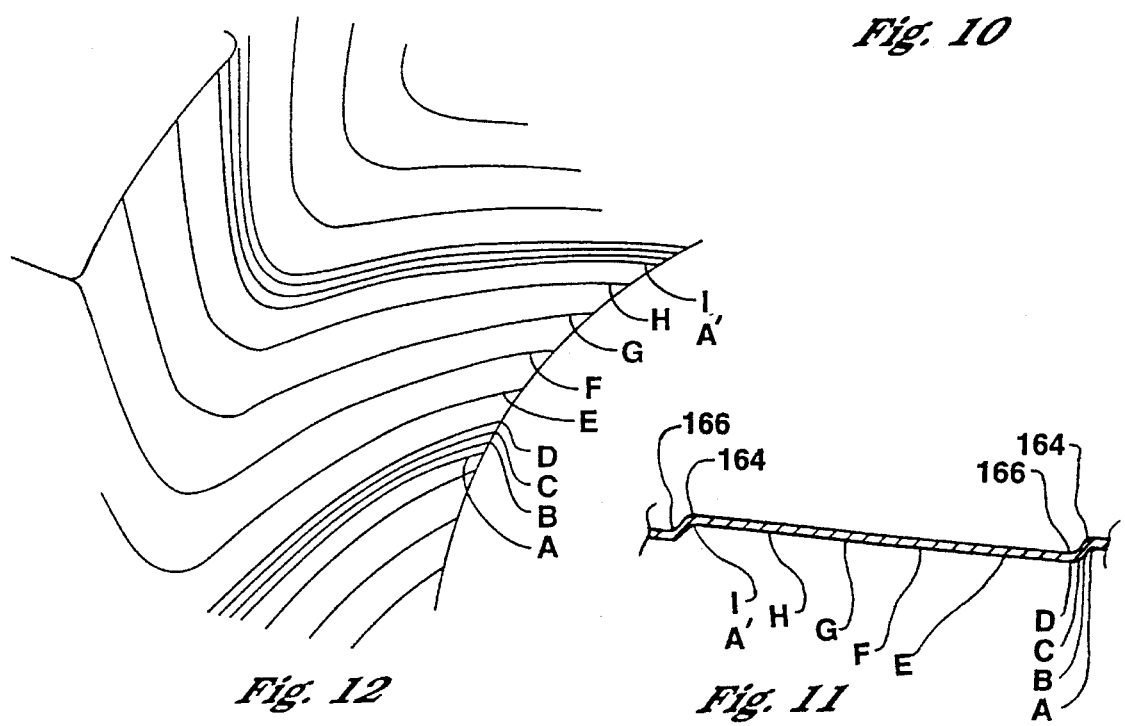
Fig. 12
Fig. 11

COMPLIANT FOIL HYDRODYNAMIC FLUID FILM THRUST BEARING

TECHNICAL FIELD

This invention relates to the general field of compliant foil hydrodynamic fluid film bearings and more particularly to an improved thrust bearing employing fluid foils, spring foils and support foils to support, position, damp and accommodate movements or excursions of the rotating portion of the bearing.

BACKGROUND OF THE INVENTION

Compliant foil hydrodynamic fluid film thrust beatings are currently being utilized in a variety of high speed rotor applications. These beatings are generally comprised of a two sided thrust disk rotating element, non-rotating compliant fluid foil members that axially enclose the rotating element, non-rotating compliant spring foil members that axially enclose the fluid foil members and a non-rotating thrust plate element and a nonrotating housing element that axially enclose and provide attachments for the foil members. The space between the rotating element and the thrust plate element on one side of the bearing and the space between the rotating element and the thrust surface of the housing element on the other side of the bearing are filled with fluid (usually air) which envelops the foils.

The motion of the rotating element applies viscous drag forces to the fluid and induces circumferential flow of the fluid between the smooth surface of the rotating element and the fluid foil. The space between the rotating element and the fluid foil is subdivided into a plurality of fluid-dynamic wedge channels. These wedge channels have typically been formed by resistance welding compliant, convex curved foil pads to an underlying support foil. The leading ramps of the foil pads relative to the fluid's circumferential flow and the smooth surface of the rotating element form the two primary surfaces of the converging wedge channels. The trailing ramps and the smooth surface of the rotating element form the primary surfaces of the diverging wedge channels. The fluid flowing circumferentially along a converging wedge channel experiences steadily decreasing flow area, increasing circumferential flow velocity and increasing static fluid pressure. If the rotating element moves toward the non-rotating element, the convergence angle of the wedge channel increases causing the fluid pressure rise along the channel to increase. If the rotating element moves away, the pressure rise along the wedge channel decreases. Thus, the fluid in the wedge channels exerts restoring forces on the rotating element that vary with and stabilize running clearances and prevent contact between the rotating and non-rotating elements of the bearing. Flexing and sliding of the foils causes coulomb damping of any axial or overturning motion of the rotating element of the bearing.

Owing to preload spring forces or gravity forces, the rotating element of the bearing is typically in physical contact with the fluid foil members of the bearing at low rotational speeds. This physical contact results in beating wear. It is only when the rotor speed is above what is termed the lift-off/touch-down speed that the fluid dynamic forces generated in the wedge channels assure a running gap between the rotating and non-rotating elements.

Conventional, compliant foil hydrodynamic fluid film thrust bearings have fluid dynamic wedge channel ramps that converge or diverge circumferentially with no radial component to the ramp slopes. The converging wedge channel ramps have no side wall or other contraints to prevent fluid flow out of the channels at their inner and outer edges. At the trailing edge of the converging wedge channel, the high fluid pressure and lack of radial flow constraints induces radial flow leakage out of the channel, which in ram, results in a reduction in fluid pressure, a loss in bearing load capacity, and an increase in bearing drag. The radial flow leakage requires make-up flow at the beginning of the converging wedge channel.

Conventional, compliant foil hydrodynamic fluid film thrust bearings have primary fluid flow patterns in the converging wedge channels that are single path recirculating loops. The fluid in the converging wedge channels adjacent to the rotating disk travels circumferentially in the same direction as the disk's motion (up the ramp) owing to viscous drag. The fluid in the converging wedge channels adjacent to the non-rotating fluid foil travels circumferentially in the direction opposite to the disk's motion (down the ramp) owing to the circumferential pressure gradient along the channel. Much of the fluid that travels up the ramp near the disk while gaining static pressure turns back before reaching the end of the wedge channel and travels down the ramp near the fluid foil while losing pressure. Almost all of this fluid turns again before reaching the beginning of the wedge channels and travels up the ramp while again gaining pressure. The fluid traveling the single path recirculating loop flow patterns travels essentially the same path each loop and experiences the same pressure increases and pressure decreases each loop with no net pressure gain from one loop to the next. These bearings generate less fluid dynamic pressure and have less load capacity than beatings that utilize multi-path vortex flow patterns where the flow traveling each regenerative loop travels a different path and where there is a net increase in fluid pressure each loop Conventional, compliant foil hydrodynamic fluid film thrust bearings operate with extremely small running clearances and moderate as opposed to low drag and power consumption. The clearances between the non-rotating fluid foils' converging channel ramp trailing ends and the rotating thrust disk is typically 50 micro-inches at operating conditions. The bearing's dimensionless drag coefficient is typically more than 0.005 at operating speeds as defined by the ratio of the fluid dynamic drag induced shear forces applied to the disk by the beating divided by the thrust load carded by the beating.

Compliant foil hydrodynamic fluid film thrust bearings tend to rely on backing springs to preload the fluid foils against the relatively moveable rotating element (thrust disk) so as to control foil position/nesting and to establish foil dynamic stability. The bearing starting torque (which should ideally be zero) is directly proportional to these preload forces. These preload forces also significantly increase the disk speed at which the hydrodynamic effects in the wedge channels are strong enough to lift the rotating element of the bearing out of physical contact with the non-rotating members of the bearing. These preload forces and the high lift-off/touch-down speeds result in significant bearing wear each time the disk is started or stopped.

Many conventional, compliant foil hydrodynamic fluid film thrust bearings have large sway spaces and loose compliance, i.e. they do not tightly restrict the axial or overturning motion of the bearing thrust disk, owing to poor control of spring deflection tolerances inherent in the spring designs.

It has been common for compliant foil hydrodynamic fluid film thrust bearings to utilize a plurality of coated, convex curved, compliant fluid foil pads that are welded to a support foil to form the fluid foil member of the bearing. These two piece fluid foil members are typically thicker and have poorer thickness control than can single piece fluid foil members. Two piece fluid foil members also experience process fluid flow turbulence, increased drag at operating speeds and reduced load capacity owing to the flow discontinuities between the trailing edges of each foil pad and the weld attachment edge of the next circumferentially located pad.

Some conventional, compliant foil hydrodynamic fluid film thrust bearings utilize spring foil elements that are formed by milling (chemically or otherwise) circumferentially offset recesses in opposing sides of flat foil stock so as to leave circumferentially offset unmilled ridges on opposing sides of the foil elements. Pressure applied to the offset ridges induces the spring foil element to deflect in a spring-like manner. Spring foil elements formed in this manner are prone to large variations in their spring rates due to small variations in milling depth. This milling process non-symetrically relieves any residual surface compressive stresses induced by previous foil rolling operations and thus induces foil warpage.

Other bearings utilize convolute shaped spring foil elements that are formed by pressing annealled Inconel 750X foil blanks between two contoured plates having matching wavy contours with constant plate to plate spacing while heat treating the foil blanks at approximately 1300 degrees Fahrenheit for approximately 20 hours. Spring foils formed in this manner are prone to have large variations in undetected thickness.

In some cases, the fluid foils may be attached to the spring foils by welding or brazing or various spring foil elements may be welded or brazed together to form a spring foil member. Those thrust bearings that utilize welding or brazing to attach one foil element to another are subject to foil distortions and foil fatigue failures, particularly at the bond sites.

The sides of the fluid foils that face the rotating element of the bearing can utilize low rubbing friction coatings to minimize bearing wear when disk speed is below the lift-off/touch-down speed speed. These coatings, however, may have large thickness tolerances that can adversely affect the foil pack thickness tolerance.

No conventional compliant foil hydrodynamic fluid film thrust bearing presently have a self shimming capability to compensate for variations in foil pack thickness. Consequently these bearings experience significant variations in preload force, starting torque, lift-off/touch-down speed, wear, and compliance (maximum bearing/rotor motion permitted) or require selection of foils based on thickness match for each foil pack.

A number of prior art patents are illustrative of conventional compliant foil hydrodynamic fluid film thrust bearings. For example, U.S. Pat. Nos. 4,082,375, 4,208,076, 4,223,958, 4,277,111, 4,277,112, 4,277,113, and 4,597,677 each describe a plurality of circumferentially curved or flat foils individually spaced and mounted (generally by welding) on an underlying support disk with individual stiffeners or undersprings mounted underneath the individual spaced foils. The individual stiffeners or undersprings take any number of a myriad of shapes and configurations in these patents.

A variant of the above is disclosed in U.S. Pat. Nos. 4,462,700, 4,621,930, 4,668,106, 4,682,900, and 5,110,220 in which either individual stiffeners or underfoils are used and/or a separate underspring or stiffener disk is utilized beneath the support disk. U.S. Pat. No. 4,348,066 describes individually mounted, overlapping foils. U.S. Pat. No. 4,767,221 teaches a plurality of individual spring elements each having a pad to which an individual flexible foil is secured.

U.S. Pat. Nos. 3,809,443, 4,116,503, 4,213,657, 4,227,753, 4,247,155, 4,300,806, 4,624,583, and 4,871,267 each disclose a unitary foil or disk with either an underspring disk or individual spring pad supports beneath the unitary foil disk. U.S. Pat. Nos. 4,247,155, 4,624,583 and 4,871,267 include either a slot or perforations in the unitary foil disk to provide make-up process fluid between the individual foil elements on the unitary foil disk. One variation of this is illustrated in U.S. Pat. Nos. 4,225,196 and 4,315,359 which describes a plurality of individual foil elements produced from a pair of stamped sheets superimposed and welded together.

A herringbone or chevron shaped trailing edge for journal bearing foils is generally disclosed in U.S. Pat. No. 3,957,317. This patent is, however, limited to individual, overlapping foils, and while it does recognize some advantage to a shaped trailing edge for a foil, it does not provide any further shaping and in no way limits leakage with any side ramping.

None of these prior art patents, individually or collectively, teach or disclose fluid foils having contoured, profiled scoop ramps to create vortex fluid flow channels on the operating surfaces of the fluid foils and prevent fluid leakage at both the inner and outer diameters. Likewise, there is no disclosure of fluid foils, spring foils and/or support foils having integral self shimming rings or to a construction which establishes the fixed foil clearance without regard to foil or spring thickness.

SUMMARY OF THE INVENTION

In the present invention, the compliant foil hydrodynamic fluid film thrust bearing generally comprises a two sided thrust disk rotor, fluid foils, spring foils, support foils, a thrust plate;, a foil retaining housing and a spacer ring. The non-rotating but compliant fluid foils are located adjacent to the two thrust faces of the rotatable disk. The fluid foils have open faced channels that induce regenerative vortex flow patterns in the process fluid. These flow patterns function as fluidic gap sensing, fluidic amplifying and fluidic force generating servosystems. The forces applied by the thrust disk through the flow controlled process fluid to the fluid foils vary inversely with fluid foil to disk gap and vary proportiontally with disk deflection.

The spring foils provide support for the fluid foils but allow them to follow the axial and overturning motion of the disk. The inner support foil is located between the fluid foil and the spring foil and provides push points that induce the flat spring foil to flex when the disk and fluid foil move. The outer support foil is located between the spring foil and the housing on one side of the bearing and between the spring foil and the thrust plate on the other side of the bearing. It also provides push points to induce spring foil deflection.

Each of the three types of foils, namely fluid foils, spring foils, and support foils, are attached to the foil retaining housing by a compliant web structure and pins. The foils are formed as thin, flat, annular sheets with integral shim rings at their periphery and contoured cutout patterns that are unique to each type of foil.

As part of the forming process, the fluid foil blank is coated on one side with a compliant, wear resistant material, then stamped with a forming tool to form the fluid flow channels. The thrust plate is preloaded towards the thrust surface of the foil retaining housing by an integral preload spring and is held away from the housing by the total thickness of the foil shim rings and the thickness of the spacer ring. This allows the bearing to essentially self shim with a small clearance between the fluid foils and the disk that is not affected by normal variations in foil or foil coating thicknesses.

The bearing has no preload force and has zero starting torque when the rotor's axis of rotation is oriented ninety degrees to the force of gravity. Owing to the vortex flow pattern of the process fluid, the bearing running clearances and load capacities are dramatically improved while lift-off speeds are significantly reduced. In addition, good damping, low running torque and small sway space are achieved. This is all accomplished at a low manufacturing cost with a low parts count.

It is therefore a principal object of the present invention to provide an improved compliant foil hydrodynamic fluid film thrust bearing.

It is another object of the present invention to provide such a be,wing with enhanced axial and overturning load carrying capacity.

It is another object of the present invention to provide such a bearing with both squeeze film and coulomb damping.

It is another object of the present invention to provide such a bearing with small sway space clearances to tightly restrict bearing and disk deflections.

It is another object of the present invention to provide such a beating with very low operating torque.

It is another object of the present invention to provide such a bearing with large running clearances between the fluid foil elements and the thrust disk.

It is another object of the present invention to provide such a bearing with fluid foil members that are not preloaded by spring forces against the thrust disk at zero speed.

It is another object of the present invention to provide such a bearing with zero starting torque when there is no gravity induced preload forces.

It is another object of the present invention to provide such a bearing with an extremely low lift-off/touch-down speed which is consistent with zero preload forces.

It is another object of the present invention to provide such a bearing with very low starting and stopping wear which is consistent with zero preload forces and a low lift-off/touch-down speed.

It is another object of the present invention to provide such a beating with converging wedge channel features (formed on the surface of the fluid foil element) that limit fluid flow losses from the channel at the radial outer and radial inner edges of those channels.

It is another object of the present invention to provide such a beating with converging wedge channel ramps formed on the surface of the fluid foil elements that have compound curve profiles with concave curvatures radially, flat slopes circumferentially at zero speed and convex curvatures at operating speed when fluid dynamic and spring forces are applied to the fluid foil elements. The profiles will form and function as scoops with radially wide fluid flow inlets, radially narrowing channel widths along the circumferential fluid flow paths, and rounded circumferentially trailing edges.

It is another object of the present invention to provide such a beating with a fluid flow pattern that prevents fluid pressure losses when the process fluid travels "down the ramp" (in a nominally circumferential direction that is opposite to the rotation of the thrust disk) adjacent to the fluid foil element.

It is another object of the present invention to provide such a bearing with a fluid flow pattern that is regenerative with a different flow path for each regenerative flow loop.

It is another object of the present invention to provide such a bearing with a vortex flow pattern.

It is another object of the present invention to provide such a bearing with fluid flow element blanks, spring foil elements and support foil elements that are fabricated by optically masked chemical etch techniques.

It is another object of the present invention to provide such a bearing with foil elements that are extremely flat owing to the processes used to roll and heat treat the foil metal and the processes used to form (e.g. etch) the foil blanks and elements.

It is another object of the present invention to provide such a bearing with foil elements that have tightly held thickness tolerances.

It is another object of the present invention to provide such a bearing with fluid foil members that are single fluid foil elements, one for each side of the bearing.

It is another object of the present invention to provide such a bearing with fluid foil elements that are formed from blanks by pressing steeply sloped joggles to function as diverging wedge channels while allowing the gradually converging wedge channel ramps to result without plastic deformation as the straight line connection between the joggles.

It is another object of the present invention to provide such a bearing with fluid foil elements that are formed from annealed blanks of nickel steel, such as Inconel 750X, by pressing at room temperature.

It is another object of the present invention to provide such a bearing with a spring foil member that has local spring rates that vary with radial location so as to accomodate variations in fluid pressure within the converging wedge channel adjacent to the local areas of the spring foil member.

It is another object of the present invention to provide such a bearing with spring foil members that are comprised of a compliant, flexed, constant thickness spring foil element, a constant thickness inner support foil element and an unflexed, constant thickness outer support foil. The two patterned support foils function as offset fulcrums that force the otherwise flat spring foil element to flex and function as a spring when force is applied between the inner and outer support foils.

It is another object of the present invention to provide such a bearing with a spring foil member that utilizes the same number of fulcrum support lines in the inner support element as it does in the outer support element.

It is another object of the present invention to provide such a bearing with a spring foil member that utilizes twice as many fulcrum support lines in the inner support element as it does in the outer support element so as to provide a tilting pad type support for the fluid foil.

It is another object of the present invention to provide such a bearing with a spring foil member that is comprised of a single spring foil element where the element is formed from an annealed metal (typically Inconel 750X) foil blank at room temperature, then heat treated to obtain high yield strength required to function as a spring.

It is another object of the present invention to provide such a bearing with a spring foil member that utilizes circumferential slits of varying length and width to set the local spring rates of the inner area of the spring foil and that utilizes varying cantilever plate beam length to set the local spring rates of the outer area of the spring foil.

It is another object of the present invention to provide such a bearing with foil elements that are not welded or brazed to form foil member assemblies.

It is another object of the present invention to provide such a bearing with pins (rigidly attached to the bearing housing) which position and resist rotation of the foil elements.

It is another object of the present invention to provide such a bearing with a non-rotating thrust plate element that is compliantly mounted to the bearing housing by a flexure which resists plate deflections normal to and rotationally about the bearing axis but which permits axial plate deflections along and overturning plate deflections about the bearing axis and which also provides axial preload forces to the disk.

It is another object of the present invention to provide such a bearing with a spacer ring element which will prevent the resiliently mounted and preloaded thrust plate element from applying preload forces to the fluid foil elements at zero disk speed and which will (along with the foil's self shimming rings) control and hold constant at any disk speed the bearing's axial play (prior to spring deflection) and the bearing's maximum deflection.

It is another object of the present invention to provide such a bearing with foils having self shimming rings at their outer periphery which (along with the spacer ring) control the axial distance between the resiliently mounted thrust plate and the thrust surface of the housing.

It is another object of the present invention to provide such a bearing with self shimming capability utilizing the resilient mounting and preload characteristics of the thrust disk, the spacer ring and the foil's self shimming rings to prevent variations in bearing axial play and sway space due to variations in foil thickness and foil coating thickness.

It is another object of the present invention to provide such a bearing with fluid foil elements, spacer ring element, thrust disk element and thrust plate element that can be installed in the thrust bearing quickly and easily.

BRIEF DESCRIPTION OF THE DRAWINGS

Figure 1:
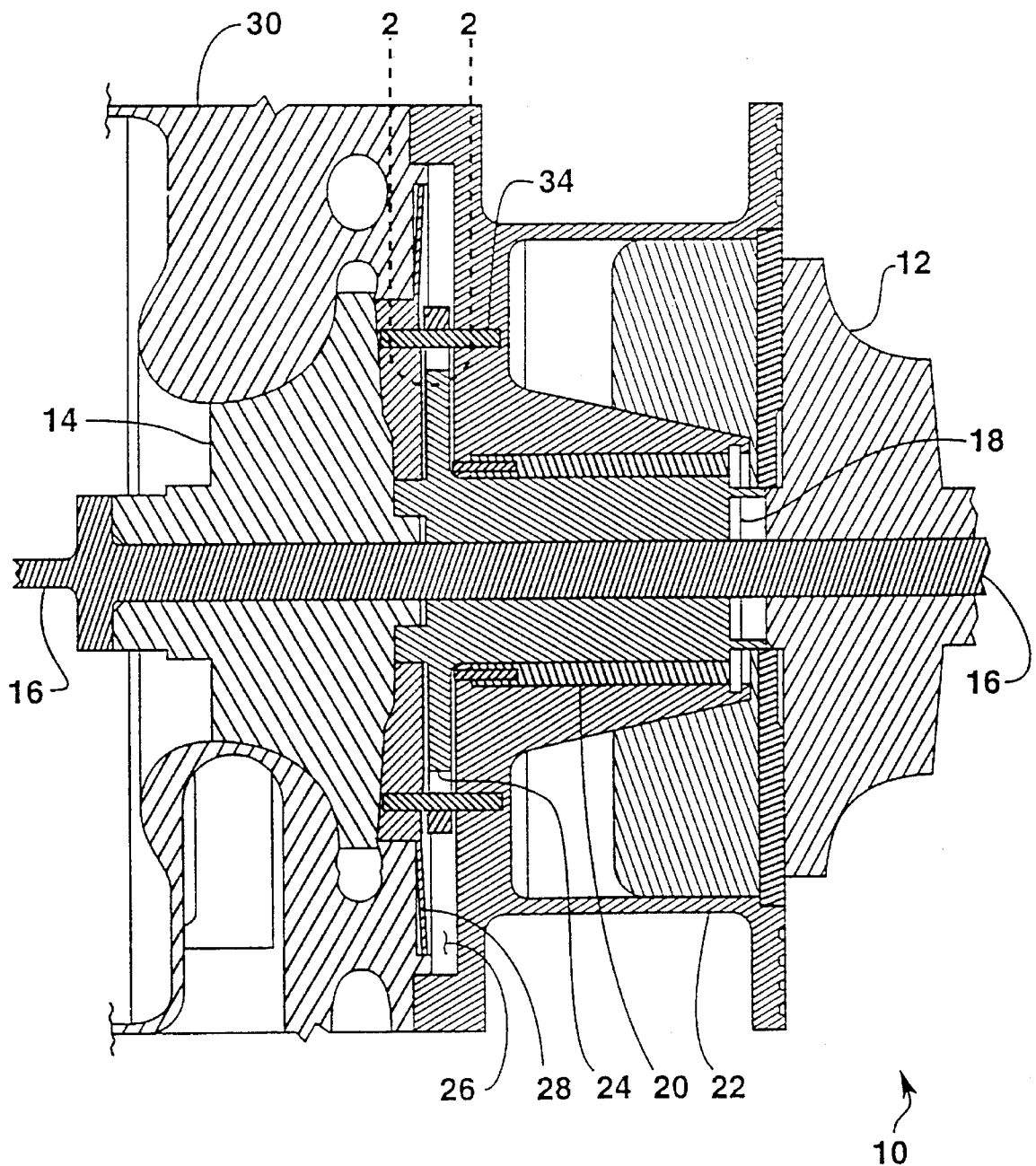
Figure 2:
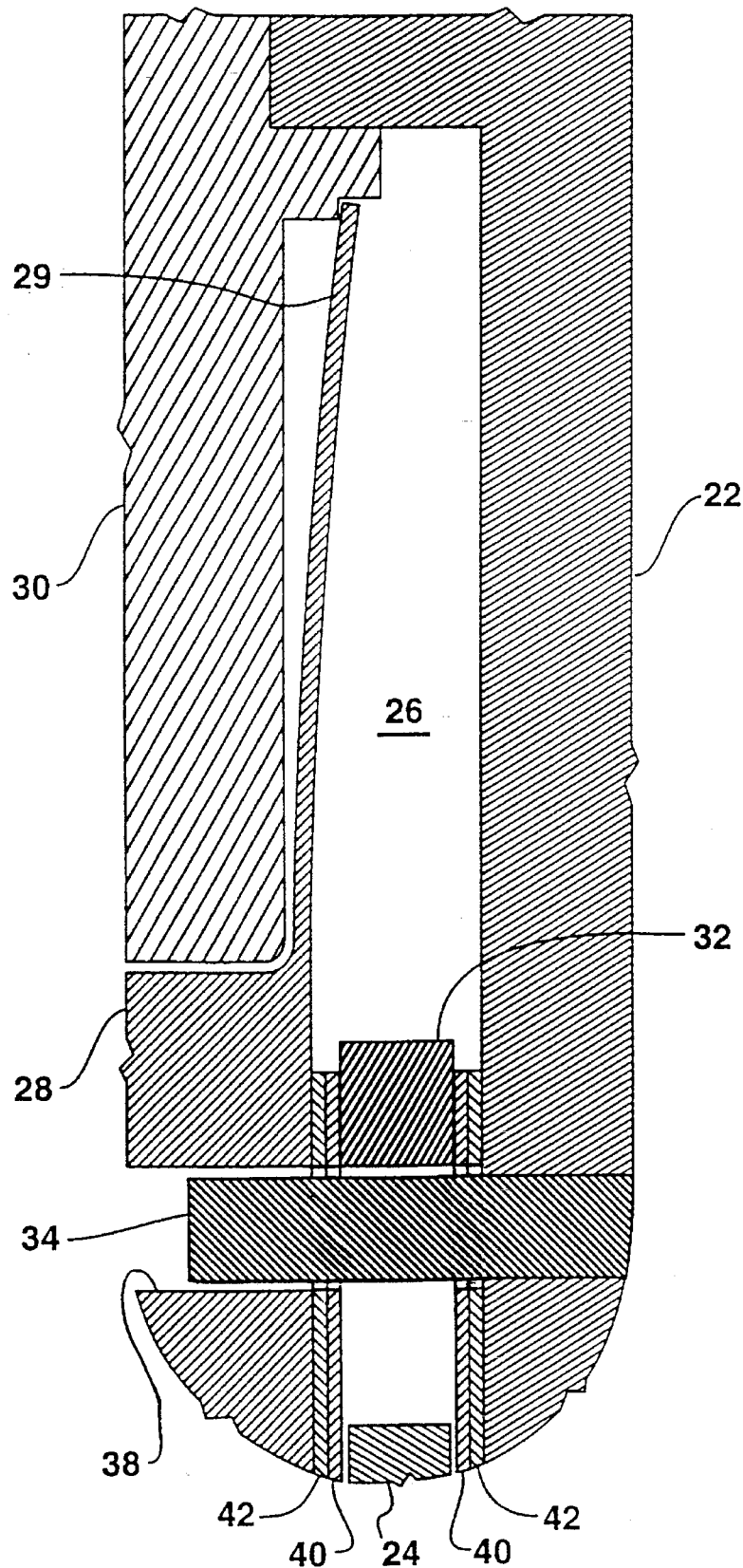
Figure 3:
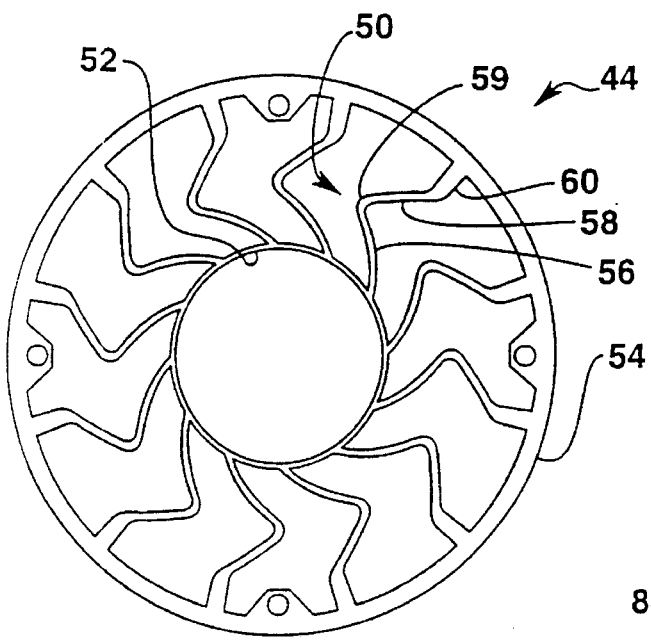
Figure 4:
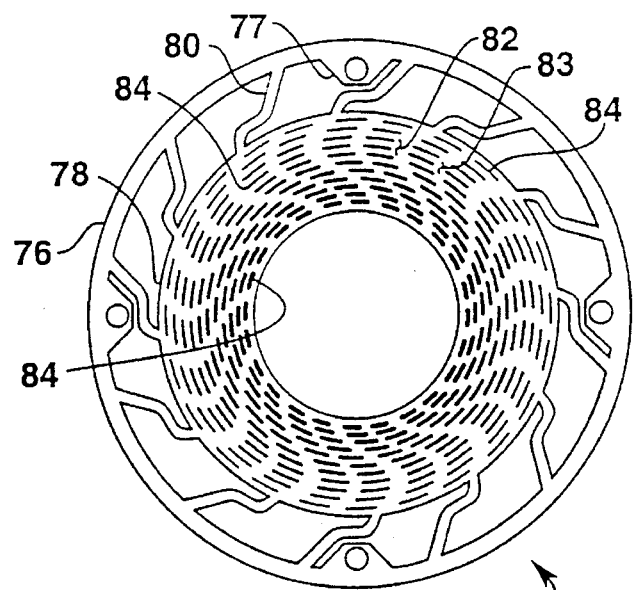
Figure 5:
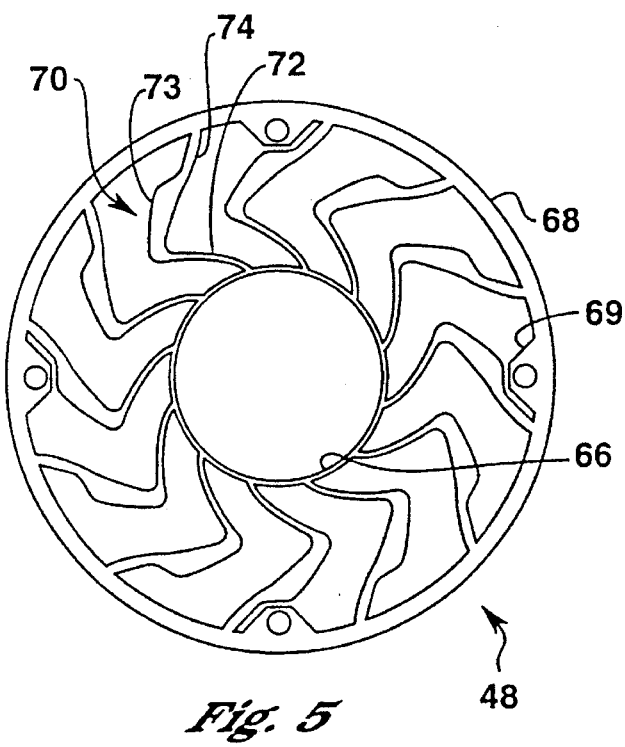
Figure 6:
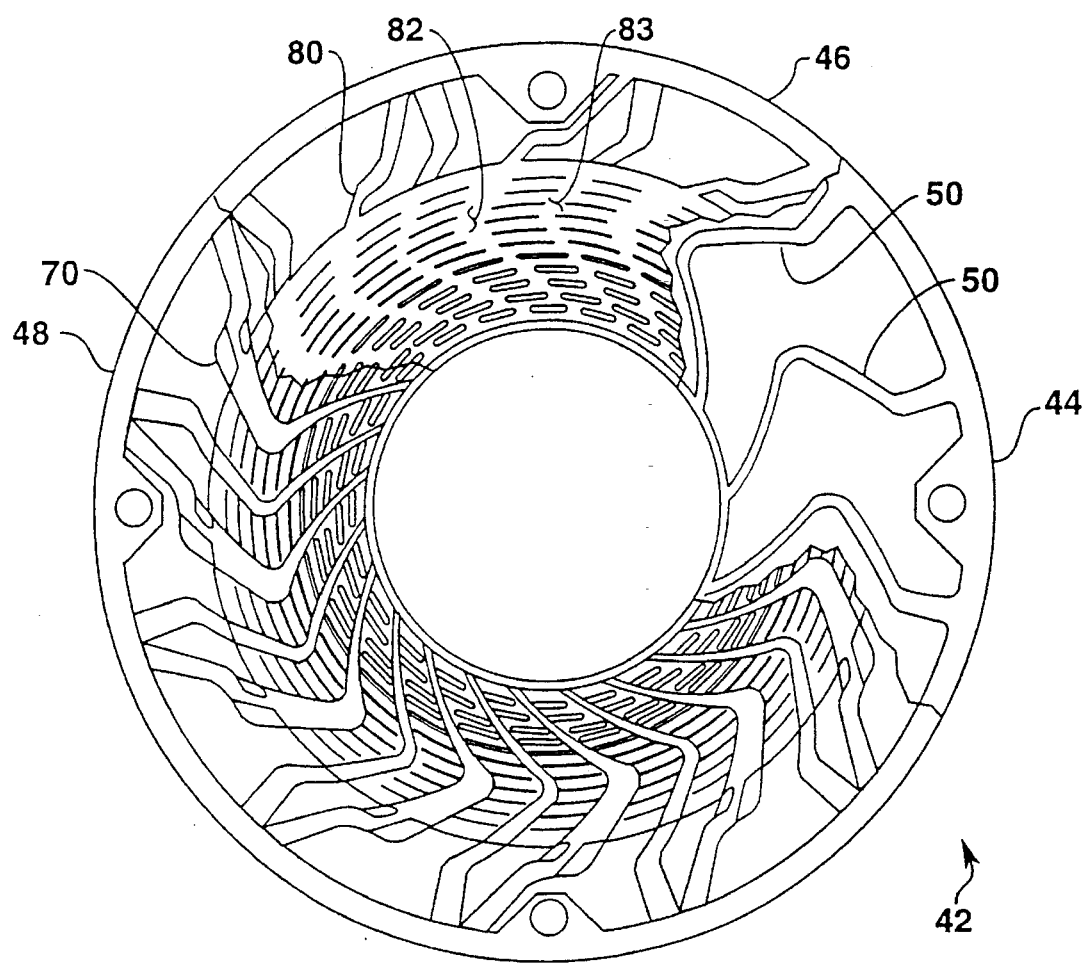

Having thus described the present invention in general terms, reference will now be made to the accompanying drawings in which:

FIG. 1 is a sectional view of a turbomachine having the compliant foil hydrodynamic fluid film thrust bearing of the present invention;

FIG. 2 is an enlarged partial view of oval 2 of FIG. 1 illustrating the thrust plate and spacer area of the compliant foil hydrodynamic fluid film thrust bearing of the present invention;

FIG. 3 is a plan view of the outer support foil for the spring foil member of the compliant foil hydrodynamic fluid film thrust bearing of the present invention;

FIG. 4 is a plan view of the spring foil element for the spring foil member of the compliant foil hydrodynamic fluid film thrust bearing of the present invention;

FIG. 5 is a plan view of the inner support foil for the spring foil member of the compliant foil hydrodynamic fluid film thrust bearing of the present invention;

FIG. 6 is a plan view, partially cut away element by element, of the spring foil member of the present invention having the outer support foil of FIG. 3, the spring foil element of FIG. 4, and the inner support foil of FIG. 5.

Figure 8:
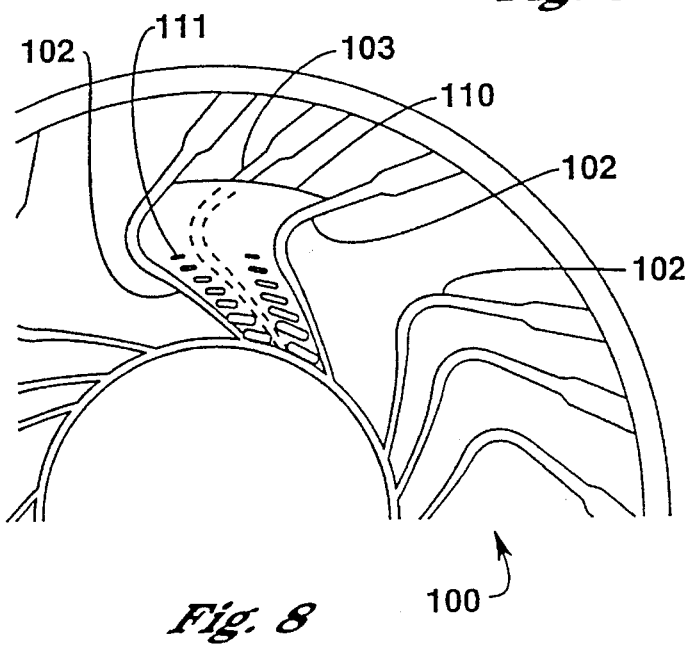
Figure 7:
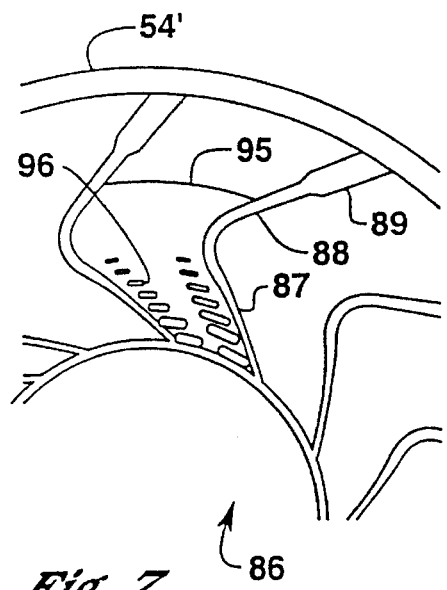
Figure 13:
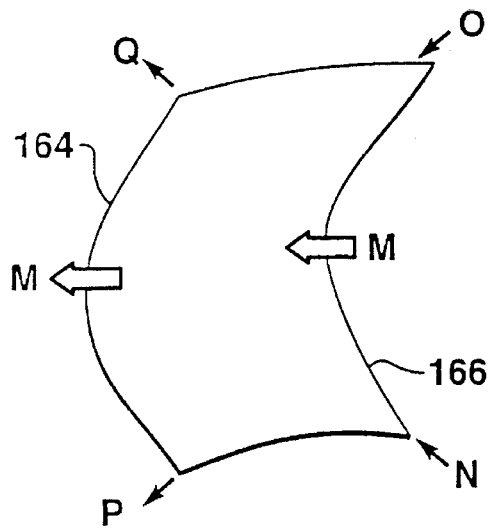
Figure 14:
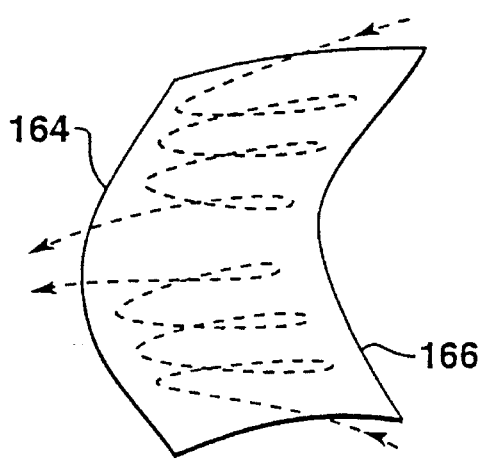
Figure 15:
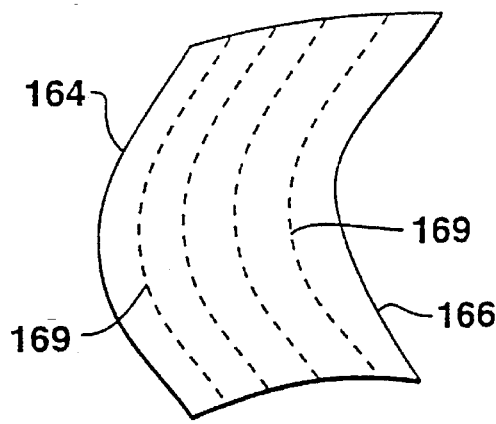
Figure 16:
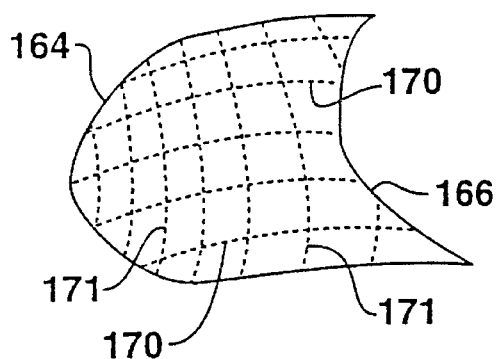
Figure 17:
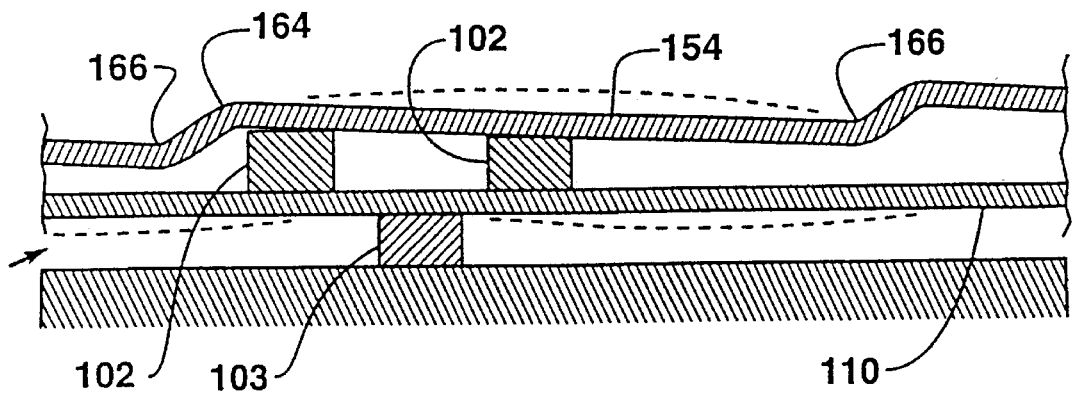

FIG. 7 is a partial plan view of an alternate configuration of an outer support foil for the spring foil member of the compliant foil hydrodynamic fluid film thrust bearing of the present invention;

FIG. 8 is a partial plan view of another alternate configuration of the spring foil member of the present invention having two inner support lines for each outer support line;

FIG. 9 is a plan view of a fluid foil element of the compliant foil hydrodynamic fluid film thrust bearing of the present invention;

FIG. 10 is an enlarged sectional view of the fluid foil element of FIG. 9 taken along fines 10—10;

FIG. 11 is another enlarged sectional view of the fluid foil element of FIG. 9 taken along lines 11—11;

FIG. 12 is an enlarged plan view of a portion of the fluid foil element of FIG. 9 illustrating lines of vertical elevation;

FIG. 13 is a plan view of a single fluid dynamic converging wedge channel of the fluid foil element of FIG. 9 illustrating the ingress and egress of process fluid;

FIG. 14 is a plan view of a single fluid dynamic converging wedge channel of the fluid foil element of FIG. 9 illustrating a simplified vortex fluid flow pattern across the fluid foil;

FIG. 15 is a plan view of a single fluid dynamic converging wedge channel of the fluid foil element of FIG. 9 illustrating constant elevation lines across the fluid foil at zero speed;

FIG. 16 is a isometric view of a single fluid dynamic converging wedge channel of the fluid foil element of FIG. 9 illustrating circumferential and radial lines of elevation; and FIG. 17 is a section view of the fluid foil element of FIG. 9 supported by the spring foil member of FIG. 8.

DETAILED DESCRIPTION OF THE PREFERRED EMBODIMENTS

A turbomachine utilizing the compliant foil hydrodynamic fluid film thrust bearing of the present invention is illustrated in FIG. 1. The turbomachine 10 generally includes turbine rotor 12 and compressor wheel 14 at opposite ends of a common shaft 16. The thrust and radial bearing shaft 18 is disposed around the common shaft 16 between the turbine rotor 12 and the compressor wheel 14. A journal bearing cartridge 20 in center bearing housing 22 rotatably supports the elongated turbine end of the bearing shaft 18.

The compressor end of the bearing shaft 18 includes a radially extending rotor or disk 24 which extends into a recess 26 in the compressor end of the center bearing housing 22. A bearing thrust plate 28 is disposed on the opposite side of the bearing shaft disk 24. The outer periphery of the compressor end of the center bearing housing 22 engages the compressor housing 30.

As best illustrated in FIG. 2, a thrust bearing spacer 32 is positioned radially outward from the disk 24 of the bearing shaft 18 and is positioned radially by a plurality of circumferentially spaced pins 34 which are fixed in holes in the recess 26 of the center bearing housing 22 and extend into holes in the thrust bearing plate 28. A thrust bearing fluid foil member 40 and thrust bearing spring foil member 42 are disposed on either side of the bearing shaft disk 24 and thrust bearing spacer 32. On one side, the fluid foil member 40, and spring foil member 42 are positioned in the recess 26 of the center bearing housing 22 and on the other side they are adjacent to the thrust bearing plate 28. The fluid foil member 40 and spring foil member 42 are held in position radially and circumferentially by the pins 34 which extend from the center bearing housing 22, through holes in one spring foil element 42, through holes in one fluid foil element 40, traverse the bore of the thrust bearing spacer 32, through holes in the opposite side fluid foil element 40, the holes in the opposite side spring foil member 42 and into holes 38 in the thrust bearing plate 28.

The radial outward end of the thrust bearing plate 28 is a thin radially extending spring 29 which is formed flat. During assembly, the outward end of this spring 29 is deflected or flexed towards the center bearing housing 22 by a lip on the compressor housing 30 to the position shown in FIG. 2. This flexing of the thrust bearing plate spring 29 effectively forces the thrust plate 28 towards the center bearing housing 22, the motion being restrained by the thrust bearing spacer 32, fluid foil members 40 and spring foil members 42. The thickness of the thrust bearing spacer 32 is several thousanths of an inch greater than the thickness of the disk 24. Variations in the foil or foil coating thicknesses inherently cause compensating variations in the spacing between the thrust plate 28 and the housing 22. Thus, variations in bearing sway space and bearing compliance due to foil thickness tolerances are prevented.

As illustrated in FIGS. 3–5, the thrust bearing spring foil member 42 generally comprises a outer support foil element 44, a spring foil element 46, and an inner support foil element 48. The outer support foil element 44, shown in FIG. 3, generally includes an inner connector ring 52 and an outer self shimming ring 54 with a plurality (shown as twelve) of spring stand-off foils 50 extending therebetween. The spring stand-off foils 50 consist of an inner curved foil section 56 extending outward from the inner connector ring 52 at a forward angle and an outer curved foil section 58 extending inward from the self shimming ring 54 at a forward angle. The foil sections 56 and 58 are nominally oriented forty degrees from circumferential at all points along their length. The foil sections 56 and 58 join together with a nose-shaped foil section 59. Foil section 58 is connected to the outer self shimming ring 54 by a radially extending connector or supporting web 60. The spring stand-off foil 50 is narrowest at the connection to the inner connector ring 52 and gradually increases in width to the point or tip of the nose and continues to gradually increase in width in the outer foil section 58 to the connector web 60. The connector web 60, which does not flex, is of an even greater constant width. A plurality of indexing tabs (shown as four) extend inward from the outer self shimming ring 54 in order to enable precise alignment of the outer support foil elements 44 with the other elements of the thrust beading spring foil member 42.

The inner support foil element 48 is illustrated in FIG. 5 and includes an inner connector ring 66, outer self shimming ring 68, and indexing tabs 69 identical to and aligned with the corresponding elements in the outer support foil element 44. A plurality of generally nose-shaped support pad foils 70 (shown as twelve) extend between the inner connector ring 66 and the outer self shimming ring 68. The inner support pad foil section 72 is at its narrowest where connected to the inner connector ring 66 and gradually increases in width to the tip of the nose where it joins the wider outer foil section 73 which extends back to a somewhat narrower connector web 74. Unlike the wider connector web 60 of the outer support foil element 44, the connector web 74 of the inner support foil element 48 does flex. The internal angle formed between the inner support pad foil section 72 and the outer support pad foil section 73 would be generally eighty degrees. Since the inner support foil element 48 does flex, the connector web 74 is narrower and is not radial but angled generally at the same angle as the wider foil section 73.

FIG. 4 illustrates the spring foil element 46 which includes an outer self shimming ring 76 and indexing tabs 77 identical to and aligned with the corresponding elements in the outer support foil element 44 and inner support foil element 48. An annular spring matrix 78 is positioned by a plurality (shown as twelve) angled connector or support webs 80. The inner diameter of the annular spring matfix 78 is slightly larger than the inner diameter of the inner connector rings 52, 66.

The annular spring matrix 78 includes a plurality of generally nose-shaped fluid foil support pads 82 extending from the angled support webs 80 to the inner diameter of the annular spring matrix 78 and a like number of generally nose-shaped stand-off pads 83 alternating therebetween. A plurality of rows (shown as eleven) of spaced annular slots 84 extend from the inner diameter of the annular spring matrix 78 to the outer diameter thereof. The rows of annular slots 84 decrease in radial width from the inner diameter to the outer diameter. The rows of annular slots 84 form a generally nose-shaped column extending between each adjacent fluid foil support pad 82 and stand-off pad 83 so that them are twenty four nose-shaped columns of slots 84.

As best illustrated in FIG. 6, the thrust bearing spring foil member 42 comprises the spring foil element 46 sandwiched between the outer support foil element 44 and the inner support foil element 48. The support pad foils 70 of the inner support foil element 48 overlay the supporting webs 80 and fluid foil support pads 82 of the spring foil element 46. The spring stand-off foils 50 of the outer support foil element 44 underlay the standoff pads 83 of the spring foil element 46.

An alternate spring stand-off foil 86 for the outer support foil element 44 is shown in FIG. 7. In this alternative, the inner foil section 87 and the outer foil section 88 join to form a bulbous nose-shape and the connector web 89 is angled from the outer self shimming ring 54' to connect with the outer foil section 88 of the alternate spring stand-off foil 86. Between two of the individual spring stand-off foils as shown, a portion of a spring matrix 95 is illustrated. This spring matfix 95 includes circumferential slots 96 only between adjacent inner foil section 87 with the slots 96 increasing in circumferential length and in radial width towards the inner diameter of the spring matrix 95.

FIG. 8 illustrates another alternate thrust bearing spring foil member 100 in which there: are two support pad foils 102 for each spring stand-off foil 103, with a support pad foil 102 disposed on either side of a spring stand-off foil 103. The circumferential distance between the trailing edge support pad foil 102 and the spring stand-off foil 103 is less than the circumferential distance between spring stand-off foil 103 and the leading edge support pad foil 102. Together, this grouping provides a tilting pad type of support for the compliant fluid foil member. For purposes of illustration, a spring matrix 110 is shown with one group of two support pad foils 102 and a spring stand-off foil 103. In this embodiment, the slots 111 in the spring matrix 110 are limited to the space between the inner sections of the support pad foils and the stand-off foils.

FIG. 17 illustrates the alternate thrust bearing spring foil member 100 of FIG. 8 supporting the fluid foil element 154 of FIG. 9. The solid lines indicate the positions of the thrust bearing spring foil member 100 and the fluid foil element 155 at rest while the dashed lines provide their relative positions at operating speed under fluid dynamic loads and demonstrates how the circumferential convex surface is formed on the fluid foil surface at operating speed.

The individual elements of the thrust bearing spring foil member 42 can be formed from flat sheets by optically masked chemical etch techniques. A nickel steel, such as Inconel 750X is a suitable material with the spring foil elements having a thickness of about 0.004 inches. The spring foil elements would normally be heat treated to full hardness in a vacuum oven at 1300 degrees Fahrenheit for about twenty hours. The three individual elements of the thrust bearing spring foil member 42 can be assembled by stacking the spring foil and two support foils without bonding. The relative micro movement of these foils in use provides coulomb damping.

FIG. 9 illustrate a fluid foil element integrally formed from a single flat disk 154. The individual fluid dynamic foils 155 are formed from a flat sheet of a nickel steel such as Inconel 750X by room temperature pressing steeply sloped joggles to function as diverging wedge channels while allowing the gradually converging wedge channel ramps to result without plastic deformation as the straight line connection between the joggles. The fluid foil elements would normally be annealed both during forming and use and may be coated prior to forming the joggles with any number of a myriad of low friction or friction reducing coating materials which can protect the metal from abrasion during starting and stopping, and inadvertent and occasional high speed touch-downs. The coating would also provide for some embedment of contamination particles.

The individual fluid dynamic foils 155 (shown as twelve) are generally chevron shaped and connected to an outer self shimming ring 158 by support webs 159. Fluid passages 160 are formed between adjacent support webs 159. Every fourth fluid passage 160 includes an indexing tab 162. Each aerodynamic foil 155 has a trailing edge 164 with a rounded trailing point 165 and a leading edge 166, a generally straight ramped contour from the leading edge 166 to the trailing edge 164, and a rounded concave contour from the circumferential line extending from the rounded trailing point 165 of the trailing edge 164 to the outer diameter of the aerodynamic foil 155 and to the inner diameter of the aerodynamic foil 155. This gives a generally scoop shape to the foil as best illustrated in the two sectional views of FIGS. 10 and 11.

FIG. 12 generally illustrates vertical lines of elevation for the corresponding points identified by letter on FIG. 11. Elevation lines from A to D (alphabetically) represent the steep diverging wedge channels while elevation lines from D to I (alphabetically) represent the shallow converging wedge channels.

The shape of the fluid dynamic foils 155, namely an open-faced channel, induces regenerative vortex flow patterns in the process fluid across the foil as generally shown in FIG. 14. As best illustrated in FIG. 13, the process fluid generally enters the leading surface of the foil 155 from the trailing edge of the preceding foil, arrow M. Any make-up process fluid is provided from the inner and outer diameter of the leading edge, arrows N and 0. Arrows P and Q at the inner diameter and outer diameter, respectively, of the trailing edge 164, represent the limited amount of leakage flow from these areas.

FIG. 15 illustrates the lines of constant elevation at zero speed with dashed lines 169. Circumferential and radial lines of elevation are shown in isometric view FIG. 16, with the circumferential lines designated 170 and the radial lines designated 17 1. Circumferential lines 170 are straight at zero speed but become convex at operating speed under the influence of fluid dynamic forces.

The compliant fluid foil elements 40 are located adjacent to the two thrust faces of the disk 24. The spring foil elements 42 provide support for the fluid foil elements 40 but allow them to follow the axial and overturning motion of the disk 24. The forces applied by the fluid foil elements to the thrust disk through the flow controlled process fluid vary inversely with foil to disk gap and vary proportionally with disk deflection. The inner support foil element 48 of the thrust bearing spring foil member 42 provides push points or lines that induce the flat spring foil element 46 to flex when the disk 24 and fluid foil member 40 move. The outer support foil element 44 of the spring foil member 42 which does not flex and abuts the central bearing housing recess 26 or the thrust plate 28 also provides push points or lines to induce fluid foil element deflection.

The thrust plate 28 is preloaded towards the thrust surface of the center bearing housing 22 by an integral preload spring and is held away from the center bearing housing 22 by the total thickness of the outer self shimming rings of the fluid foil members 40 and spring foil members 42 and the thickness of the thrust bearing spacer 32. The thrust bearing spacer 32 is slightly thicker than the disk 24 so that there is a small clearance between the fluid foil member 40 and the disk 24 that is not affected by normal variations in foil or foil coating thickness. The bearing has no preload force and has zero starting torque when the disk's axis of rotation is oriented ninety degrees to the force of gravity. With the regenerative vortex flow pattern established by the contour of the fluid foil elements, the bearing running clearances are significantly improved (increased) by an order of magnitude and lift-off speeds are significantly less than previously possible.

The converging wedge channel ramps formed in the surface of the fluid foil elements have compound curve profiles with concave curvatures radially, flat slopes circumferentially at zero speed and convex curvatures at operating speed when fluid dynamic and spring forces are applied to the foil elements. The profiles will form and function as scoops with radially wide fluid flow inlets, a radially narrowing channel width along the circumferential fluid flow paths, and rounded circumferentially trailing edges. This multi-path regenerative vortex fluid flow pattern prevents fluid pressure losses when the process fluid travels "down the ramp" in a nominally circumferential direction that is opposite to the rotation of the thrust disk adjacent to the fluid foil member.

The spring foil element produces local spring rates that vary with radial location so as to accomodate variations in fluid pressure within the converging wedge channels adjacent to the local areas of the spring foil member. The two patterned support foils function as offset fulcrums that force the otherwise flat spring foil element to flex and function as a spring when force is applied between the inner and outer support foils. If the inner fulcrum support lines are doubled, a tilting pad type support is provided for the fluid foil member. This is best shown in FIG. 17 with the dotted lines indicating position under load.

The annular spring matrix utilizes circumferential or arcuate slots of varying length and width to set the local spring rates of the inner area of the spring foil member and also utilizes varying cantilever plate beam length to establish the local spring rates of the outer area of the spring foil member. The spring matrix slots force strain lines to travel circumferentially. The radial spring rate is nominally higher at larger diameters because the peripheral velocity of the process fluid is higher. But, the spring rate must also be reduced near the inner and outer diameters dues to fluid flow leakage. The spring rate increases slightly from the outer diameter to the nose owing to reduced plate cantilever beam length. The spring rate decreases from the nose to the inner diameter (despite decreasing cantilever beam length) owing to the radial orientation of the beams and reduced beam width.

The scoop-shaped conveging wedge channels formed on the surface of the fluid foil elements induce vortex fluid flow patterns and limit process fluid flow losses from the channels at the radial inner and outer edges of the foils. This, together with the self shimming construction and other features of the present invention, provides a thrust bearing having high load carrying capacity, good damping, small sway clearances, low running torque, high running foil to disk clearances, zero preload force, low starting torque, low lift-off/touch-down speeds, and low wear. In addition, all of this is achieved with a low parts count, low manufacturing cost, and ease of assembly.

While specific embodiments of the invention have been illustrated and described, it is to be understood that these are provided by way of example only and that the invention is not to be construed as being limited thereto but only by the proper scope of the following claims.

What I claim is:

1. A compliant foil hydrodynamic fluid film thrust bearing comprising:

a bearing housing having a thrust bearing surface and an opposed thrust bearing plate;

a shaft rotatably supported within said bearing housing and including a thrust disk radially extending between said thrust bearing surface and said opposed thrust bearing plate;

a pair of annular compliant fluid foil members with one of said pair of members disposed on either side of said thrust disk;

a pair of annular spring foil members with one of said pair of members disposed between an annular compliant fluid foil member and said thrust bearing surface and the other of said pair of annular spring foil members disposed between said other of said pair of annular compliant fluid foil members and said thrust bearing plate;

a bearing spacer disposed between said pair of annular compliant fluid foil members at the outer periphery of said disk, said bearing spacer having an axial thickness slightly greater than the axial thickness of said thrust disk; and means to operably position said pair of annular compliant fluid foil members, said pair of annular spring foil members, and said bearing spacer between said thrust bearing surface and said opposed thrust plate to establish a clearance between said annular compliant fluid foil members and said rotating thrust disk.

2. The compliant foil hydrodynamic fluid film thrust bearing of claim 1 and in addition, means to preload said thrust plate towards said thrust bearing surface of said bearing housing.

3. The compliant foil hydrodynamic fluid film thrust bearing of claim 2 wherein said thrust bearing plate includes a radially outwardly extending flexure spring which, when said thrust bearing is assembled, preloads said thrust plate towards said thrust bearing surface of said bearing housing.

4. The compliant foil hydrodynamic fluid film thrust bearing of claim 1 wherein said bearing spacer is between two thousanths and eight thousanths of an inch greater in axial thickness than said thrust disk.

5. The compliant foil hydrodynamic fluid film thrust bearing of claim 1 wherein the periphery of each of said pair of annular compliant fluid foil members and each of said pair of annular spring foil members include a self-shimming peripheral ring such that the thickness of said rings and the thickness of said bearing spacer together establish the clearance between the annular compliant fluid foil elements and said rotating thrust disk.

6. The compliant foil hydrodynamic fluid film thrust bearing of claim 5 wherein each of said pair of annular compliant fluid foil members and each of said pair of annular spring foil members include a plurality of peripheral tabs having indexing openings therein and, in addition, said bearing includes a like plurality of pins with individual pins extending from said bearing housing through said annular compliant fluid foil members, said annular spring foil members, said bearing spacer and into said thrust bearing plate.

7. The compliant foil hydrodynamic fluid film thrust bearing of claim 5 wherein each of said pair of annular compliant fluid foil members is formed from a flat sheet and is contoured by cold pressure.

8. The compliant foil hydrodynamic fluid film thrust bearing of claim 7 wherein each of said pair of annular compliant fluid foil members is uniform in material thickness.

9. The compliant foil hydrodynamic fluid film thrust bearing of claim 7 wherein each of said pair of annular compliant fluid foil members is uniformly coated with a friction reducing material before forming.

10. The compliant foil hydrodynamic fluid film thrust bearing of claim 5 wherein each of said pair of annular compliant fluid foil members includes a plurality of converging ramps and diverging joggles to form alternating converging and diverging wedge channels on the surface of said annular compliant fluid foil members with said diverging wedge channels relatively steep and said converging wedge channels generally scoop-shaped to limit the leakage of process fluid from the sides of said channels.

11. The compliant foil hydrodynamic fluid film thrust bearing of claim 5 wherein each of said pair of annular compliant fluid foil members includes a plurality of converging wedge channel ramps formed on the surface thereof to define a plurality of compliant fluid foils having compound curve profiles with concave curvatures radially, flat slopes circumferentially at rest and convex curvatures circumferentially at operating speed when process fluid dynamic forces and spring forces are applied to said annular compliant fluid foil members.

12. The compliant foil hydrodynamic fluid film thrust bearing of claim 11 wherein said compound curve profiles of said annular compliant fluid foil members function as fluidic gap sensing, fluidic amplifying and fluidic force generating servosystems.

13. The compliant foil hydrodynamic fluid film thrust bearing of claim 11 wherein said compound curve profiles of said annular compliant fluid foil members induce regenerative vortex flow patterns in the process fluid.

14. The compliant foil hydrodynamic fluid film thrust bearing of claim 1 wherein each of said pair of annular compliant fluid foil members includes a plurality of scoop-like foils disposed towards said thrust disk.

15. The compliant foil hydrodynamic fluid film thrust bearing of claim 5 wherein each of said pair of annular spring foil members is completely formed from a flat sheet by chemical etch techniques.

16. The compliant foil hydrodynamic fluid film thrust bearing of claim 5 wherein each of said pair of annular spring foil members comprises a flat formed inner support foil element having a plurality of spaced support pad foils, a flat formed outer support foil element having a like plurality of offset spaced spring stand-off foils and a flat formed spring foil element disposed between said inner and said outer support foil elements.

17. The compliant foil hydrodynamic fluid film thrust bearing of claim 16 wherein each of the flat formed inner support foil elements includes two spaced support pads for each spring stand-off pad of said flat formed outer support foil element.

18. The compliant foil hydrodynamic fluid film thrust bearing of claim 17 wherein the circumferential distance between the trailing edge support pad and the stand-off pad is less than the circumferential distance between the leading edge support pad and the standoff pad.

19. The compliant foil hydrodynamic fluid film thrust bearing of claim 1 wherein each of said pair of annular spring foil members has a spring rate that varies radially.

20. The compliant foil hydrodynamic fluid film thrust bearing of claim 19 wherein the radial variation in spring rate of said pair of annular spring foil members is achieved by varying the length, spacing and width of circumferential slots in the flat formed spring foil element.

21. The compliant foil hydrodynamic fluid film thrust bearing of claim 19 wherein the radial variation in spring rate of said pair of annular spring foil members is achieved by varying the plate cantilever beam length of said flat formed spring foil element.

22. The compliant foil hydrodynamic fluid film thrust bearing of claim 20 wherein, the circumferential width of the circumferential slots in the flat formed spring foil element decreases from the inner diameter of the annular spring foil members towards the outer diameter thereof.

23. An annular, compliant fluid foil element for a hydrodynamic fluid film thrust bearing comprising an annular compliant foil disk including a plurality of converging ramps and diverging joggles to form alternating converging and diverging wedge channels on the surface of said disk with said diverging wedge channels relatively steep and said converging wedge channels generally scoop-shaped to limit the leakage of process fluid from the sides of said channels.

24. The annular, compliant fluid foil element of claim 23 wherein said annular compliant foil disk is cold formed from a flat sheet.

25. The annular, compliant fluid foil element of claim 23 wherein said annular compliant foil disk is formed by pressing steeply sloped joggles to function as diverging wedge channels while allowing the gradually converging wedge channel ramps to result without plastic deformation as the straight line connection between the joggles.

26. The annular compliant fluid foil element of claim 23 wherein the periphery of said annular compliant foil disk includes a self-shimming peripheral ring.

27. The annular compliant fluid foil element of claim 23 wherein the periphery of said annular compliant foil disk includes a plurality of peripheral tabs having indexing openings therein.

28. The annular, compliant fluid foil element of claim 23 wherein said annular compliant foil disk includes a plurality of scoop-like foils.

29. An annular, compliant fluid foil element for a hydrodynamic fluid film thrust bearing comprising an annular compliant foil disk including a plurality of converging wedge channel ramps formed on the surface thereof to define a plurality of compliant fluid foils having compound curve profiles with concave curvatures radially, flat slopes circumferentially at rest and convex curvatures circumferentially at operating speed when process fluid dynamic forces and spring forces are applied to said compliant fluid foils.

30. The annular, compliant fluid foil element of claim 29 wherein said compound curve profiles function as scoops with radially wide fluid flow inlets, radially narrowing channel widths along circumferential fluid flow paths and rounded circumferential trailing edges.

31. The annular, compliant fluid foil element of claim 29 wherein said annular compliant foil disk is cold formed from a flat sheet.

32. The annular, compliant fluid foil element of claim 31 wherein said annular compliant foil disk is uniformly coated with a friction reducing material before forming.

33. The annular, compliant fluid foil element of claim 32 wherein said annular compliant foil disk is uniform in material thickness.

34. The annular, compliant fluid foil element of claim 29 wherein the periphery of said annular compliant foil disk includes a self-shimming peripheral ring.

35. The annular, compliant fluid foil element of claim 29 wherein the periphery of said annular compliant foil disk includes a plurality of peripheral tabs having indexing openings therein.

36. The annular, compliant fluid foil element of claim 29 wherein said annular compliant foil disk includes a plurality of scoop-like foils.

37. The annular, compliant fluid foil element of claim 29 wherein said annular compliant foil disk is formed from a flat sheet and is contoured by cold pressure.

38. The annular, compliant fluid foil element of claim 37 wherein said annular compliant foil disk is uniformly coated with a friction reducing material before forming.

39. The annular, compliant fluid foil element of claim 37 wherein said annular compliant foil disk is uniform in material thickness.

40. The annular, compliant fluid foil element of claim 29 wherein said compound curve profiles induce regenerative vortex flow patterns in the process fluid.

41. The annular, compliant fluid foil element of claim 29 wherein said compound curve profiles function as fluidic gap sensing, fluidic amplifying and fluidic force generating servosystems.

42. A compliant foil hydrodynamic fluid film thrust bearing comprising:

a bearing housing having a thrust bearing surface and an opposed thrust bearing plate including a radially outwardly extending flexure spring which, when said thrust bearing is assembled, preloads said thrust plate towards said thrust bearing surface of said bearing housing;

a shaft rotatably supported within said bearing housing and including a thrust disk radially extending between said thrust bearing surface and said opposed thrust bearing plate;

a pair of annular compliant fluid foil members with one of said pair of members disposed on either side of said thrust disk, the periphery of each of said pair of annular compliant fluid foil members including a self-shimming peripheral ring;

a pair of annular spring foil members with one of said pair of members disposed between an annular compliant fluid foil member and said thrust bearing surface and the other of said pair of annular spring foil members disposed between said other of said pair of annular compliant fluid foil members and said thrust bearing plate, the periphery of each of said pair of annular spring foil members including a self-shimming peripheral ring;

a bearing spacer disposed between said pair of annular compliant fluid foil members at the outer periphery of said disk, said bearing spacer having an axial thickness slightly greater than the axial thickness of said thrust disk; and the thickness of said pair of annular compliant fluid foil member peripheral rings, the thickness of said pair of annular spring foil member peripheral rings and the thickness of said bearing spacer together establishing a clearance between the annular compliant fluid foil elements and said rotating thrust disk.

43. A compliant foil hydrodynamic fluid film thrust bearing comprising:

a bearing housing having a thrust bearing surface and an opposed thrust bearing plate including a radially outwardly extending flexure spring which, when said thrust bearing is assembled, preloads said thrust plate towards said thrust bearing surface of said bearing housing;

a shaft rotatably supported within said bearing housing and including a thrust disk radially extending between said thrust bearing surface and said opposed thrust bearing plate;

a pair of annular compliant fluid foil members with one of said pair of members disposed on either side of said thrust disk, each of said pair of annular compliant fluid foil members including a plurality of converging ramps and diverging joggles to form alternating converging and diverging wedge channels on the surface of said annular compliant fluid foil elements with said diverging wedge channels relatively steep and said converging wedge channels generally scoop-shaped to limit the leakage of process fluid from the sides of said channels;

a pair of annular spring foil members with one of said pair of members disposed between an annular compliant fluid foil member and said thrust bearing surface and the other of said pair of annular spring foil members disposed between said other of said pair of annular compliant fluid foil members and said thrust bearing plate, each of said pair of annular spring foil members including a flat formed inner support foil element having a plurality of spaced support pad foils, a flat formed outer support foil element having a like plurality of offset spaced spring stand-off foils and a flat formed spring foil element disposed between said inner and said outer support foil elements, the spring rate of said pair of annular spring foil members varying radially by varying the length, spacing and width of circumferential slots in the flat formed spring foil element;

a bearing spacer disposed between said pair of annular compliant fluid foil members at the outer periphery of said disk, said bearing spacer having an axial thickness between two thousanths and eight thousanths of an inch greater than the axial thickness of said thrust disk;

each of said pair of annular compliant fluid foil members and each of said pair of annular spring foil members including a self shimming peripheral ring and a plurality of peripheral tabs having indexing openings therein;

the thickness of said pair of annular compliant fluid foil member peripheral rings, the thickness of said pair of annular spring foil member peripheral rings and the thickness of said bearing spacer together establishing a clearance between the annular compliant fluid foil elements and said rotating thrust disk; and a plurality of pins extending from said bearing housing through said annular compliant foil members' indexing openings, said annular spring foil members' indexing openings, said bearing spacer and into the thrust bearing plate.

44. The compliant foil hydrodynamic fluid film thrust bearing of claim 43 wherein each of the flat formed inner support foil elements includes a trailing edge support pad and a leading edge support pad for each spring stand-off pad of said flat formed outer support foil element and the circumferential distance between the trailing edge support pad and the stand-off pad is less than the circumferential distance between the leading edge support pad and the stand-off pad.

* * * * *

UNITED STATES PATENT AND TRADEMARK OFFICE
CERTIFICATE OF CORRECTION

PATENT NO. : 5,529,398
DATED : June 25, 1996
INVENTOR(S) : Robert W. Bosley

It is certified that error appears in the above-indentified patent and that said Letters Patent is hereby corrected as shown below:

Column 1, line 15, change "beatings" to --bearings--
Column 1, line 17, change "beatings" to --bearings--
Column 1, line 22, change "nonrotating" to --non-rotating--
Column 1, line 59, change "beating" to --bearing--
Column 2, line 5, change "ram" to --turn--
Column 2, line 31, change "beatings" to --bearings--
Column 2, line 44, change "beating" to --bearing--
Column 2, line 44, change "carded" to --carried--
Column 2, line 45, change "beating" to --bearing--
Column 3, lines 30-31, change "undetected" to --undeflected--
Column 4, line 22, delete ":"
Column 4, line 40, change ";" to --,--
Column 5, line 23, change "be,wing" to --bearing--
Column 5, line 32, change "beating" to --bearing--
Column 5, line 50, change "beating" to --bearing--
Column 5, line 55, change "beating" to --bearing--
Column 5, line 66, change "beating" to --bearing--
Column 8, line 16, change "fines" to --lines--
Column 9, line 56, change "beading" to --bearing--
Column 10, line 16, change "matfix" to --matrix--
Column 10, line 39, change "standoff" to --stand-off--
Column 10, line 48, change "matfix" to --matrix--
Column 10, line 53, delete ":"
Column 12, line 5, change "17 1" to --171--

UNITED STATES PATENT AND TRADEMARK OFFICE
CERTIFICATE OF CORRECTION

PATENT NO. : 5,529,398
DATED : June 25, 1996
INVENTOR(S) : Robert W. Bosley

It is certified that error appears in the above-indentified patent and that said Letters Patent is hereby corrected as shown below:

Column 15, line 22, Claim 18, line 5, change "standoff" to --stand-off--
Column 15, line 37, Claim 22, line 2, delete ","
Column 15, line 58, Claim 26, line 1, after "annular" insert --,--
Column 15, line 61, Claim 27, line 1, after "annular" insert --,--

Signed and Sealed this

First Day of October, 1996

Attest:

BRUCE LEHMAN

Attesting Officer

Commissioner of Patents and Trademarks